US012670743B2

(12) United States Patent
Sun

(10) Patent No.: US 12,670,743 B2
(45) Date of Patent: Jun. 30, 2026

(54) METHOD AND APPARATUS FOR DETECTING KEY POINT OF IMAGE, COMPUTER DEVICE AND STORAGE MEDIUM

(71) Applicant: Black Sesame Technologies Co., Ltd., Wuhan (CN)

(72) Inventor: Hao Sun, Wuhan (CN)

(73) Assignee: Black Sesame Technologies Co., Ltd. (CN)

( * ) Notice: Subject to any disclaimer, the term of this patent is extended or adjusted under 35 U.S.C. 154(b) by 282 days.

(21) Appl. No.: 18/214,168

(22) Filed: Jun. 26, 2023

(65) Prior Publication Data

US 2023/0343137 A1    Oct. 26, 2023

(51) Int. Cl.
| | |
|---|---|
| *G06V 40/16* | (2022.01) |
| *G06T 5/73* | (2024.01) |
| *G06T 7/73* | (2017.01) |
| *G06V 10/764* | (2022.01) |

(Continued)

(52) U.S. Cl.
CPC ............. *G06V 40/171* (2022.01); *G06T 5/73* (2024.01); *G06T 7/73* (2017.01); *G06V 10/764* (2022.01);

(Continued)

(58) Field of Classification Search
None
See application file for complete search history.

(56) References Cited

U.S. PATENT DOCUMENTS

2021/0248355 A1 * 8/2021 Wang ..................... G06V 10/82
2021/0319589 A1 * 10/2021 Lu ......................... A61B 5/6898
(Continued)

FOREIGN PATENT DOCUMENTS

| | | |
|---|---|---|
| CN | 111079686 A | 4/2020 |
| CN | 112613428 A | 4/2021 |
| WO | WO2020238374 A1 * | 12/2020 ............... G06K 9/00 |

OTHER PUBLICATIONS

Insung Baek, Seoung Bum Kim, 3-Dimensional convolutional neural networks for predicting StarCraft II results and extracting key game situations, PLOS One, Mar. 3, 2022.

(Continued)

*Primary Examiner* — Leon Viet Q Nguyen
(74) *Attorney, Agent, or Firm* — Timothy T. Wang; Panorama IP Group PLLC

(57) ABSTRACT

A method and device for detecting the key point of an image. The method includes acquiring the image, performing pre-processing to generate a multi-channel image with a specific type, and inputting the image into a detection model. The detection model includes a regression branch and an inter-frame residual branch. If the image type is the discrete frame, the system determines coordinates of multiple key points in the image based on a regression prediction value outputted by the regression branch. If the image type is continuous frame, the system determines coordinates of multiple key points in the image based on a regression prediction value outputted by the regression branch and a residual prediction value outputted by the inter-frame residual branch. The method can be used in the detection of discrete frame and discrete frame type images and can improve the stability of key point detection of images.

16 Claims, 12 Drawing Sheets

(51) Int. Cl.
    *G06V 10/766*     (2022.01)
    *G06V 10/774*     (2022.01)
    *G06V 10/776*     (2022.01)
    *G06V 10/82*     (2022.01)

(52) U.S. Cl.
    CPC .......... *G06V 10/766* (2022.01); *G06V 10/774* (2022.01); *G06V 10/776* (2022.01); *G06V 10/82* (2022.01); *G06T 2207/20081* (2013.01); *G06T 2207/20084* (2013.01); *G06T 2207/30201* (2013.01)

(56)         References Cited

U.S. PATENT DOCUMENTS

2021/0397822 A1\*  12/2021  Zhang ..................... G06V 10/82
2022/0067345 A1\*   3/2022  Subramanian ....... G06V 40/172

OTHER PUBLICATIONS

Dong X , Yu S I, Weng X , et al. Supervision-by-Registration: An Unsupervised Approach to Improve the Precision of Facial Landmark Detectors[C]// 2018 IEEE/CVF Conference on Computer Vision and Pattern Recognition. IEEE, 2018.
D Merget, Rock M , Rigoll G . Robust Facial Landmark Detection via a Fully-Convolutional Local-Global Context Network[C]// 2018 IEEE/CVF Conference on Computer Vision and Pattern Recognition (CVPR). IEEE, 2018.
Weiwei Xu, Jun Li, A Robust Real-time Tracking Method of Facial Key Point, Computer Engineering, vol. 44, No. 4, Apr. 2018.

\* cited by examiner

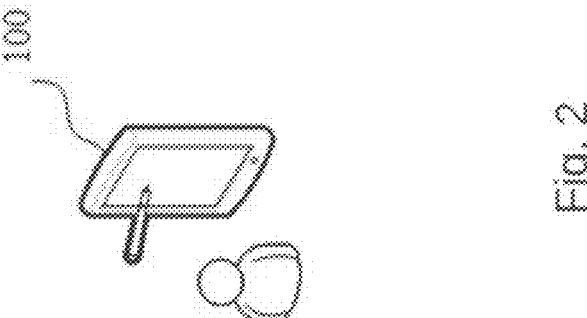
Fig. 2
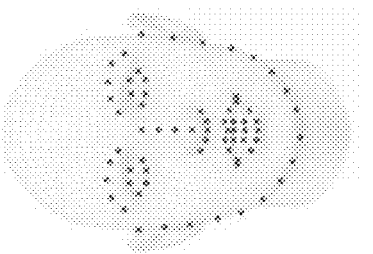
Fig. 1

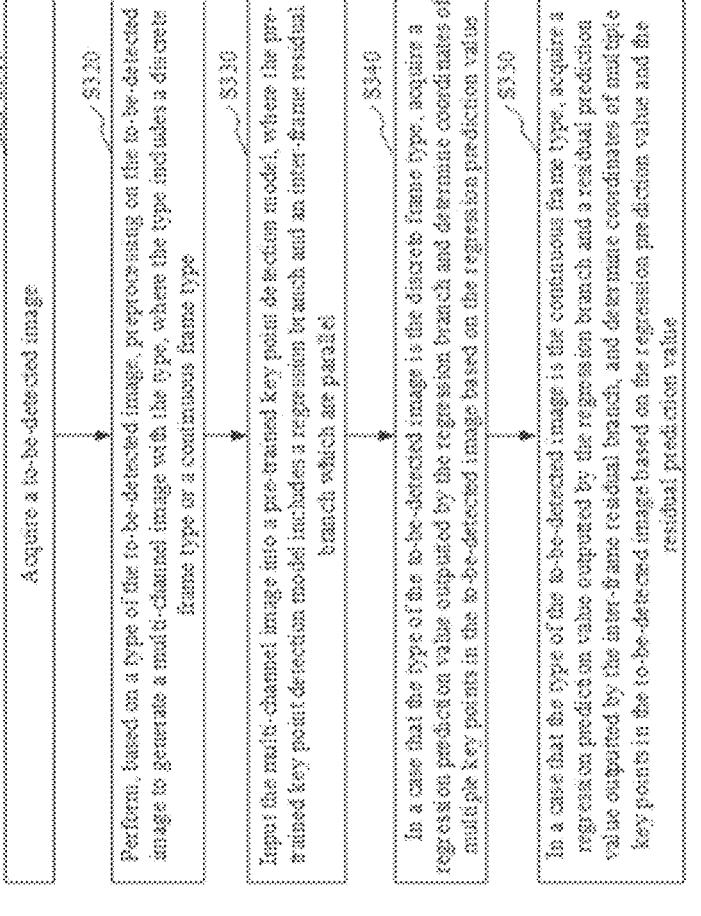

Acquire a to-be-detected image
_S310

Perform, based on a type of the to-be-detected image, preprocessing on the to-be-detected image to generate a multi-channel image with the type, where the type includes a discrete frame type or a continuous frame type
_S320

Input the multi-channel image into a pre-trained key point detection model, where the pre-trained key point detection model includes a regression branch and an inter-frame residual branch which are parallel
_S330

In a case that the type of the to-be-detected image is the discrete frame type, acquire a regression prediction value outputted by the regression branch and determine coordinates of multiple key points in the to-be-detected image based on the regression prediction value
_S340

In a case that the type of the to-be-detected image is the continuous frame type, acquire a regression prediction value outputted by the regression branch and a residual prediction value outputted by the inter-frame residual branch, and determine coordinates of multiple key points in the to-be-detected image based on the regression prediction value and the residual prediction value
_S350

Fig. 3

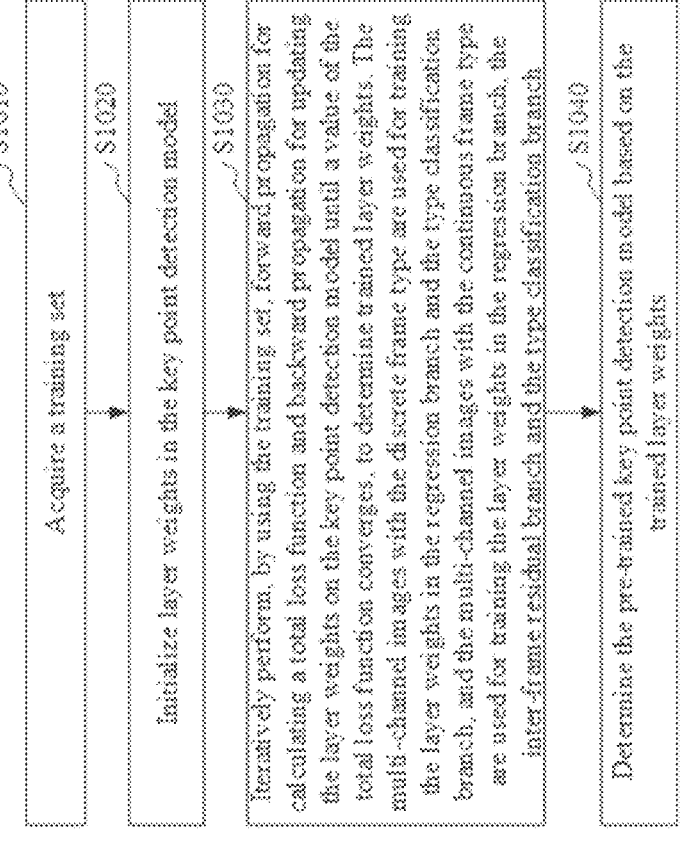

S1010

Acquire a training set

S1020

Initialize layer weights in the key point detection model

S1030

Iteratively perform, by using the training set, forward propagation and backward propagation for calculating a total loss function and backward propagation for updating the layer weights on the key point detection model until a value of the total loss function converges, to determine a trained layer weights. The multi-channel images with the discrete frame type are used for training the layer weights in the regression branch and the type classification branch, and the multi-channel images with the continuous frame type are used for training the layer weights in the regression branch, the inter-frame residual branch and the type classification branch

S1040

Determine the pre-trained key point detection model based on the trained layer weights

Fig. 10

METHOD AND APPARATUS FOR DETECTING KEY POINT OF IMAGE, COMPUTER DEVICE AND STORAGE MEDIUM

FIELD OF THE INVENTION

The present disclosure relates to the technical field of image processing, in particular to a method for detecting a key point of an image, an apparatus for detecting a key point of an image, a computer device and a storage medium.

BACKGROUND OF THE INVENTION

In the technical field of image processing, there is a key point detection technology, which is used to detect and track key points of interest on a target object in an image. Depending on the application field, the target object may be, for example, a human body, a human face or other objects.

Taking the target object being a human face as an example, a corresponding human face key point detection technology is widely used in applications related to human face, such as human face beautification, human face makeup beautification, human face recognition. As shown in FIG. 1, human face key points are multiple key points located at multiple predefined positions on the human face. These predefined key points include points with well-defined semantic definitions and other points. In human face key point detection, it is necessary to detect the position of each predefined key point on the human face.

In the existing human face key point detection technology, key point detection is generally performed on a single-frame image, and the technology focus mainly on improving an accuracy of the key point detection. However, for the key point detection of the image with a continuous frame type such as in a video, key point detection results of previous and subsequent frames obtained by the existing key point detection technology are prone to large differences, resulting in a case that the obtained key point position jitters in the previous and subsequent frames and other unstable cases, which affects a display effect of the applications related to human face.

SUMMARY OF THE INVENTION

Based on this, it is necessary to address the above technical problems and provide a method for detecting a key point of an image, an apparatus for detecting a key point of an image, a computer device and a storage medium that can consider the key point detection for both an image with a discrete frame type and an image with a continuous frame type and can improve a stability of detection results for adjacent frames of images with the continuous frame type.

A method for detecting a key point of an image includes:
acquiring a to-be-detected image;
performing, based on a type of the to-be-detected image, preprocessing on the to-be-detected image to generate a multi-channel image with the type, where the type includes a discrete frame type or a continuous frame type;
inputting the multi-channel image into a pre-trained key point detection model, where the pre-trained key point detection model includes a regression branch and an inter-frame residual branch which are parallel;
in a case that the type of the to-be-detected image is the discrete frame type, acquiring a regression prediction value outputted by the regression branch and determining coordinates of multiple key points in the to-be-detected image based on the regression prediction value; and
in a case that the type of the to-be-detected image is the continuous frame type, acquiring a regression prediction value outputted by the regression branch and a residual prediction value outputted by the inter-frame residual branch, and determining coordinates of multiple key points in the to-be-detected image based on the regression prediction value and the residual prediction value.

An apparatus for detecting a key point of an image includes:
an image acquiring module, configured to acquire a to-be-detected image;
a preprocessing module, configured to perform, based on a type of the to-be-detected image, preprocessing on the to-be-detected image to generate a multi-channel image with the type, where the type includes a discrete frame type or a continuous frame type;
a model predicting module, configured to input the multi-channel image into a pre-trained key point detection model, where the pre-trained key point detection model includes a regression branch and an inter-frame residual branch which are parallel; and
a key point determining module, configured to: in a case that the type of the to-be-detected image is the discrete frame type, acquire a regression prediction value outputted by the regression branch and determine coordinates of multiple key points in the to-be-detected image based on the regression prediction value; and in a case that the type of the to-be-detected image is the continuous frame type, acquire a regression prediction value outputted by the regression branch and a residual prediction value outputted by the inter-frame residual branch, and determine coordinates of multiple key points in the to-be-detected image based on the regression prediction value and the residual prediction value.

A computer device includes a memory and a processor. The memory stores a computer program. The processor, when executing the computer program, implements following operations:
acquiring a to-be-detected image;
performing, based on a type of the to-be-detected image, preprocessing on the to-be-detected image to generate a multi-channel image with the type, where the type includes a discrete frame type or a continuous frame type;
inputting the multi-channel image into a pre-trained key point detection model, where the pre-trained key point detection model includes a regression branch and an inter-frame residual branch which are parallel;
in a case that the type of the to-be-detected image is the discrete frame type, acquiring a regression prediction value outputted by the regression branch and determining coordinates of multiple key points in the to-be-detected image based on the regression prediction value; and
in a case that the type of the to-be-detected image is the continuous frame type, acquiring a regression prediction value outputted by the regression branch and a residual prediction value outputted by the inter-frame residual branch, and determining coordinates of multiple key points in the to-be-detected image based on the regression prediction value and the residual prediction value.

A computer-readable storage medium stores a computer program. The computer program, when executed by a processor, implements following operations:

acquiring a to-be-detected image;

performing, based on a type of the to-be-detected image, preprocessing on the to-be-detected image to generate a multi-channel image with the type, where the type includes a discrete frame type or a continuous frame type;

inputting the multi-channel image into a pre-trained key point detection model, where the pre-trained key point detection model includes a regression branch and an inter-frame residual branch which are parallel;

in a case that the type of the to-be-detected image is the discrete frame type, acquiring a regression prediction value outputted by the regression branch and determining coordinates of multiple key points in the to-be-detected image based on the regression prediction value; and in a case that the type of the to-be-detected image is the continuous frame type, acquiring a regression prediction value outputted by the regression branch and a residual prediction value outputted by the inter-frame residual branch, and determining coordinates of multiple key points in the to-be-detected image based on the regression prediction value and the residual prediction value.

In the method and apparatus for detecting a key point of an image, the computer device and the storage medium described above, a corresponding multi-channel image is generated based on the type of the to-be-detected image, so that the to-be-detected image with the discrete frame type and the to-be-detected image with the continuous frame type correspond to the multi-channel images with a unified format, and the same key point detection model is used to be compatible with the detection of the to-be-detected images with different types. During detecting, in a case that the type of the to-be-detected image is the discrete frame type, coordinates of the multiple key points in the to-be-detected image are determined based on the regression prediction value outputted by the regression branch, so as to accurately and efficiently detect the key points in the image with the discrete frame type; in a case that the type of the to-be-detected image is the continuous frame type, coordinates of the multiple key points in the to-be-detected image are determined based on the regression prediction value outputted by the regression branch and the residual prediction value outputted by the inter-frame residual branch, so as to consider the stability of the key point position between adjacent frames when detecting the position of the key point of the to-be-detected image, thereby avoiding excessive jumping of the key point position between adjacent frames. Therefore, the solution of the present disclosure can consider the key point detection for both the image with the discrete frame type and the image with the continuous frame type and can improve the stability of the key point detection results for adjacent frames of images with the continuous frame type.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 1 is a schematic diagram of human face key points according to an embodiment;

FIG. 2 is a schematic diagram of a terminal according to an embodiment;

FIG. 3 is a schematic flow chart of a method for detecting a key point of an image according to an embodiment;

5

Figure 8:
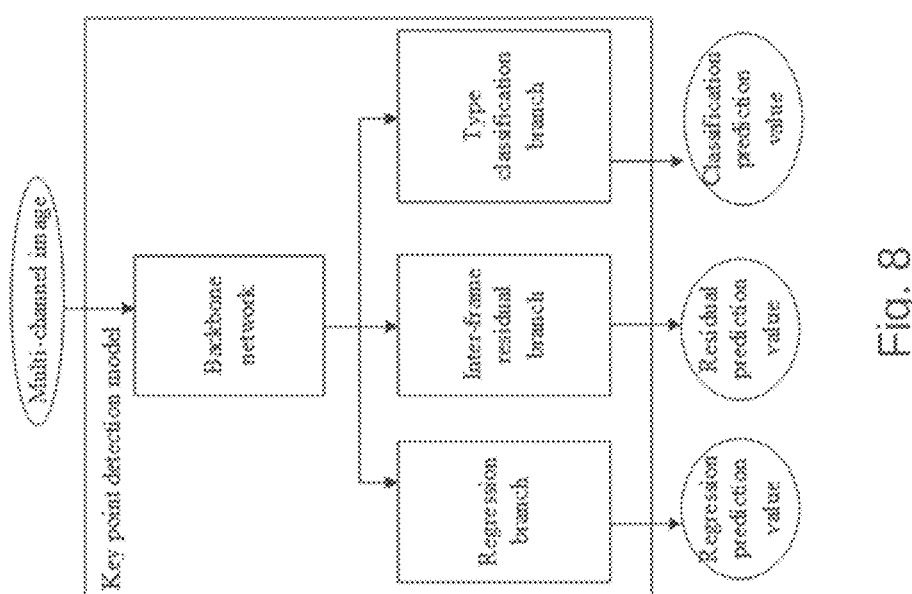
Figure 9:
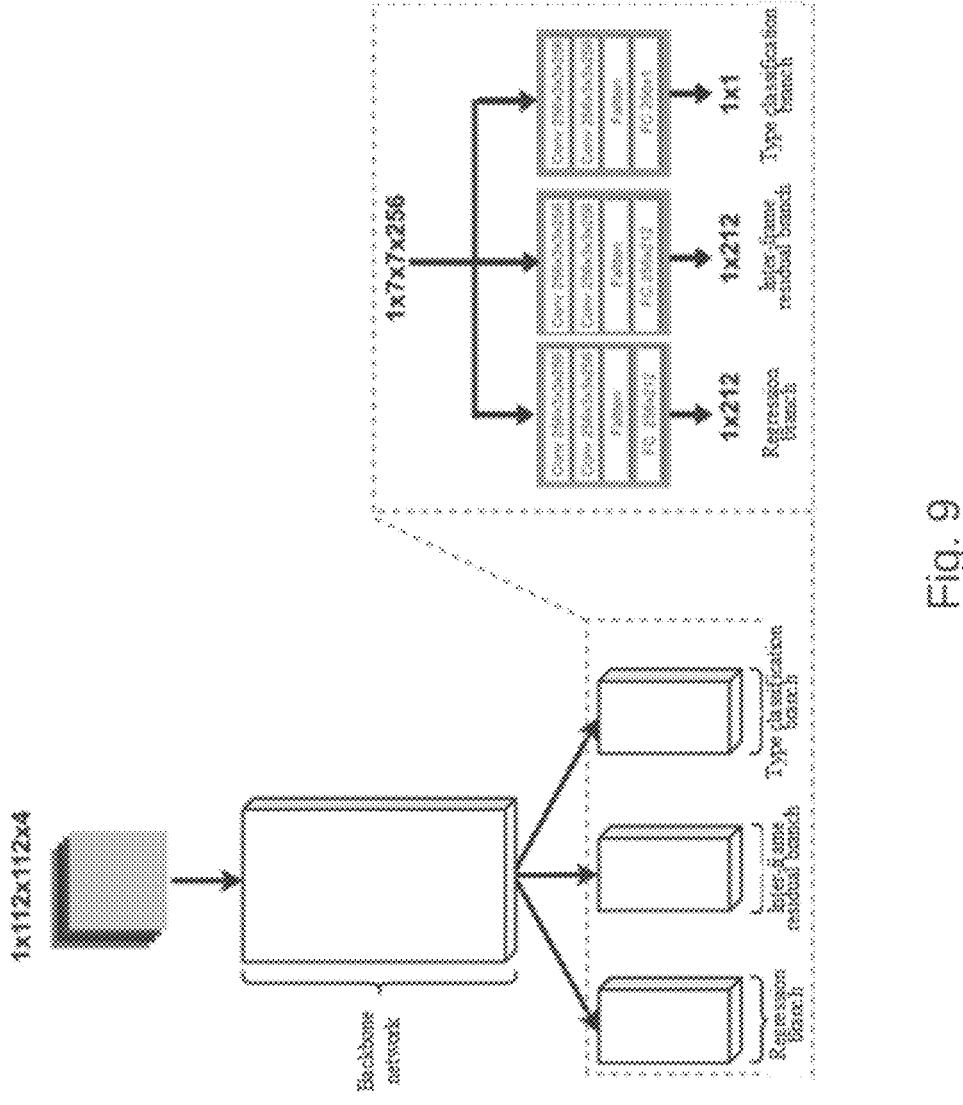
Figure 11:
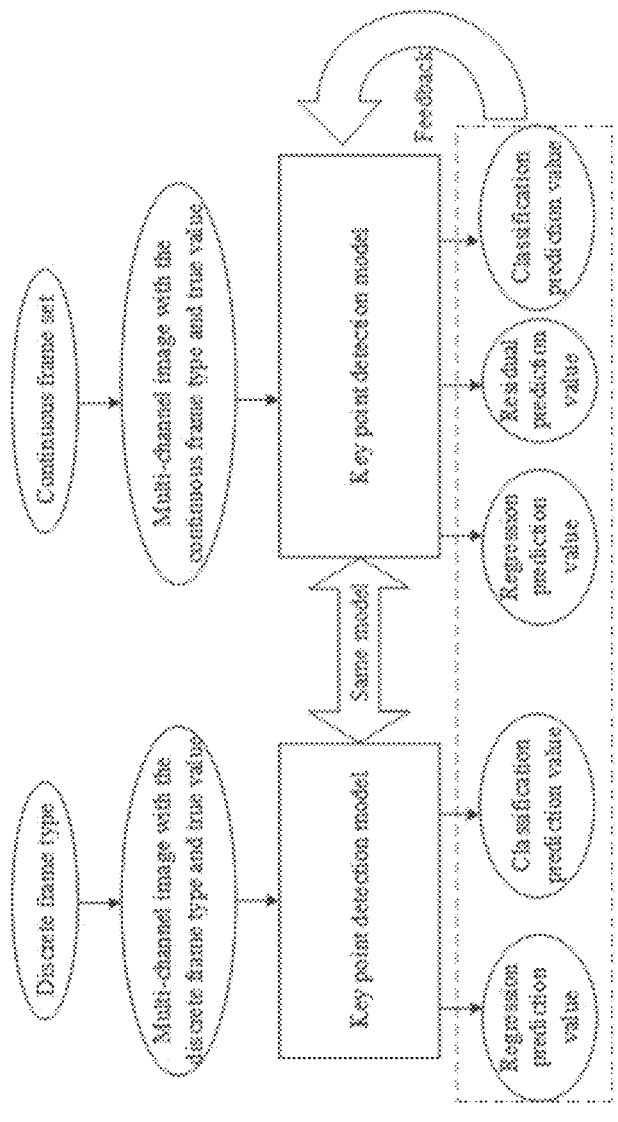
Figure 12:
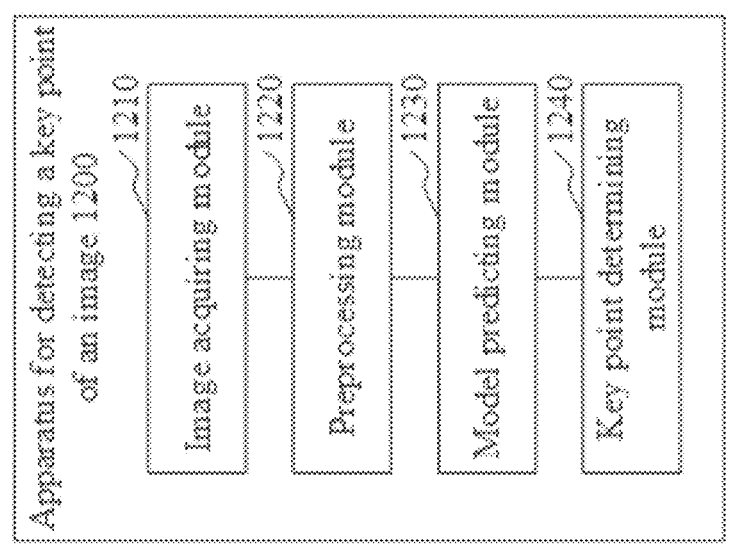
Figure 13:
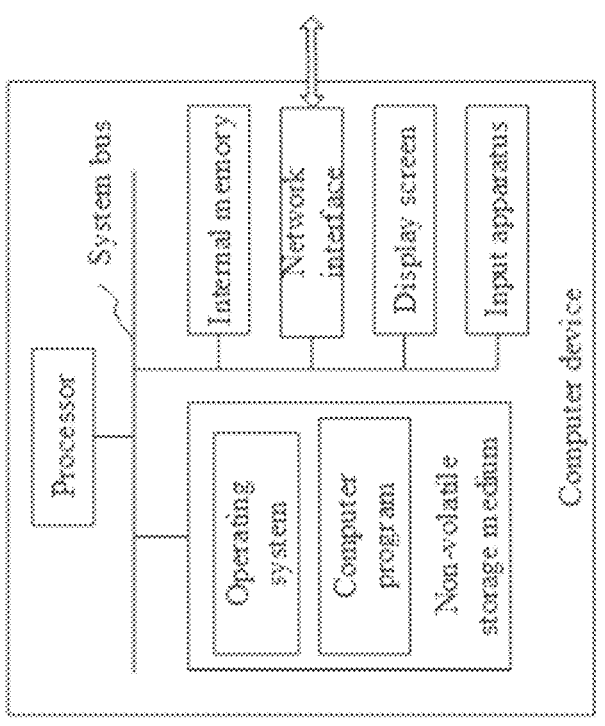

FIG. 8 is a schematic diagram of a key point detection model according to another embodiment;

FIG. 9 is a schematic diagram of a key point detection model according to another embodiment;

FIG. 10 is a schematic flow chart of a training process of the key point detection model according to an embodiment;

FIG. 11 is a schematic diagram of a training process of the key point detection model according to an embodiment;

FIG. 12 is a structural block diagram of an apparatus for detecting a key point of an image according to an embodiment; and FIG. 13 is an internal structure diagram of a computer device according to an embodiment.

DETAILED DESCRIPTION OF THE INVENTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

With the popularity of deep learning, more and more key point detection algorithms are implemented by using convolutional neural networks. For discrete frame pictures, key points may be detected by methods such as regression and heat maps. For continuous frames such as a video, jitter may be eliminated by methods such as optical flow tracking, optical flow superimposed on the current frame for training. However, there are currently few algorithms that can adaptively consider the key point detection for the image with the discrete frame type and the image with the continuous frame type.

When a human eye observes an object, due to the existence of visual transient phenomena, tiny jitters are usually ignored. However, for conventional algorithms for single-frame images, information of a current frame can only be seen at each detection and the difference between adjacent frames is ignored, thereby resulting in jitter in the key point detection results between adjacent frames.

Aiming at the defects existing in the conventional art, the present disclosure provides a method for detecting a key point of an image that can consider the key point detection for both an image with a discrete frame type and an image with a continuous frame type and can improve a stability of detection results for adjacent frames of images with the continuous frame type.

The method for detecting a key point of an image provided in this disclosure may be applied to a terminal 100 shown in FIG. 2. The terminal 100 may be, but not limited to, various personal computers, notebook computers, smart phones, tablet computers and portable wearable devices. The method for detecting a key point of an image may include a training process and a detection process. In the training process, the key point detection model may be trained by using a training set to obtain a trained key point detection model. The training process may be performed in the terminal 100, and the trained key point detection model is stored in the terminal 100 for use. Alternatively, the training process may also be performed on external devices such as other terminals or servers, and after the trained key point detection model is obtained, the trained key point detection model is loaded from other external devices to the terminal 100 for use. In the case that the trained key point detection model has been loaded into the terminal 100, in the detection process, the terminal 100 may perform the method for detecting a key point of an image provided in the embodiment of this disclosure on the to-be-detected image, to determine the coordinates of multiple key points in the to-be-detected image.

In each example of this disclosure, in order to facilitate understanding, the target object being a human face is taken as an example for illustration. For example, the key points of this disclosure include 106 predefined key points which are distributed in eyebrows, eyes, nose, mouth and an outside contour area of the human face. In the detection process, the positions of the 106 key points in the to-be-detected image are detected. However, the present disclosure may also be applied in a case that the target object is another object, and more or fewer key points or key points at different positions may be set in the present disclosure.

Figure 4:
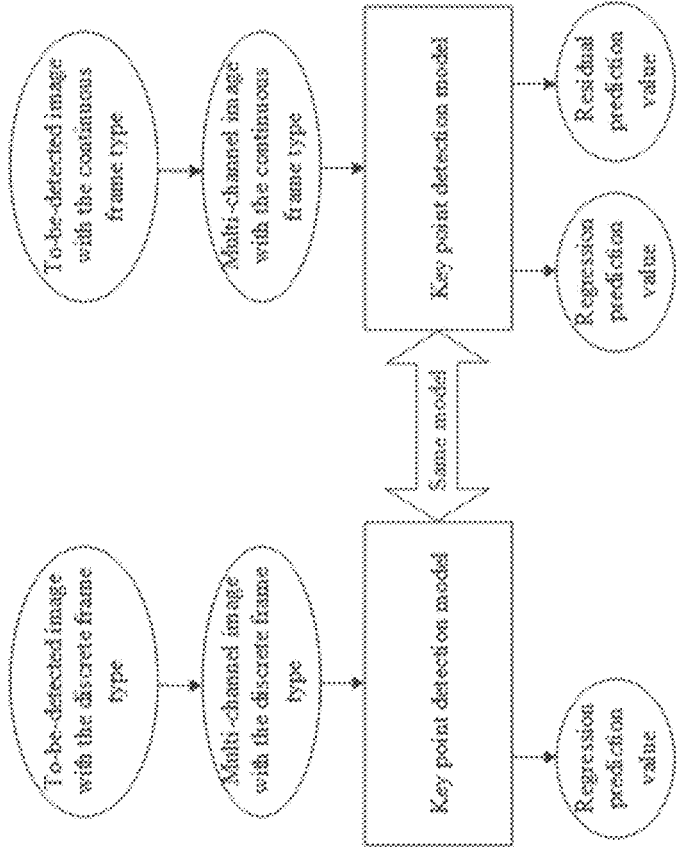
FIG. 4 is a schematic diagram of a method for detecting a key point of an image according to an embodiment.

In one embodiment, as shown in FIG. 3 and FIG. 4, a method for detecting a key point of an image is provided. The method being applied to the terminal 100 in FIG. 2 is taken as an example for illustration. The method includes the following steps S310 to S350.

Step S310, acquire a to-be-detected image.

In one embodiment, step S310 includes: acquiring an original image; performing target object detection on the original image to determine an area where the target object is located; intercepting a sub-image containing the target object from the area; resizing a size of the sub-image to a target size to determine the to-be-detected image.

Exemplarily, the original image is, for example, an image captured by the terminal 100 or an external device, and there is a target object to be detected in the original image. The target object may be, for example, a human face or the like. Correspondingly, a bounding box where the human face is located may be detected from the original image by a human face recognition algorithm. The sub-image in the bounding box is intercepted, and the size of the sub-image is resized to the target size, the target size may be, for example, a resolution of 112×112, thereby obtaining the to-be-detected image with a resolution of 112×112.

Step S320, perform, based on a type of the to-be-detected image, preprocessing on the to-be-detected image to generate a multi-channel image with the type, where the type includes a discrete frame type or a continuous frame type.

In one embodiment, the to-be-detected image is a multi-color channel image, and step S320 includes: in a case that the type of the to-be-detected image is the discrete frame type, generating a first grayscale image, with a same resolution as the to-be-detected image and with a value of each pixel value being zero, as a grayscale residual image, combining the multi-color channel image with the grayscale residual image to generate a multi-channel image with the discrete frame type; and in a case that the type of the to-be-detected image is the continuous frame type, determining a second grayscale image of the to-be-detected image, acquiring a previous frame image adjacent to the to-be-detected image, determining a third grayscale image of the previous frame image, determining a difference between the second grayscale image and the third grayscale image as a grayscale residual image, and combining the multi-color channel image with the grayscale residual image to generate a multi-channel image with the continuous frame type.

In one embodiment, the multi-color channel image may be a three-channel image with a red channel, a green channel and a blue channel, and the generated multi-channel image may be a four-channel image with a red channel, a green channel, a blue channel, and a grayscale residual channel. In other embodiments, the multi-color channel image may be an image with other image modes such as a three-channel image with a hues channel, a saturation channel and a brightness channel, and the generated multi-channel image may include a multi-channel image formed by combining the image with other image modes and a grayscale residual image.

For example, after obtaining the to-be-detected image with a resolution of 112×112, it may first be determined whether the type of the to-be-detected image is the discrete frame type or the continuous frame type. A picture with the discrete frame type refers to a picture that has no significant relationship with other pictures, such as a picture in a picture format. A picture with the continuous frame type refers to a picture that is related to an adjacent picture in the time domain, such as a picture in a video format file or in a video stream.

For example, taking the to-be-detected image being an RGB three-channel image as an example, according to the different types of the to-be-detected image, the to-be-detected image may be preprocessed in the following two ways.

Figure 5:
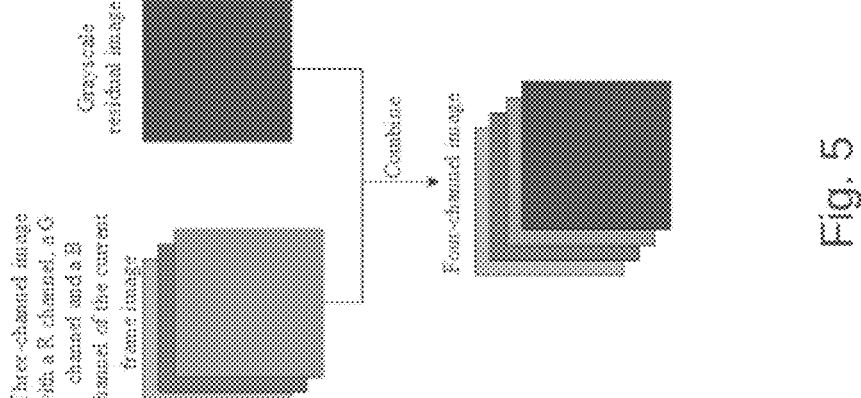
FIG. 5 is a schematic diagram of generating a multi-channel image with a discrete frame type according to an embodiment.

(1) Referring to FIG. 5, in a case that the to-be-detected image with the resolution of 112×112 has the discrete frame type, a zero-value image with a resolution of 112×112 and with a value of each pixel value being zero is generated, and a first grayscale image of the zero-value image is taken as a grayscale residual image. It can be understood that a value of each pixel in the first grayscale image is also zero. The RGB three-channel image of the to-be-detected image in the current frame is combined with the grayscale residual image to generate a four-channel image with a resolution of 112×112.

Figure 6:
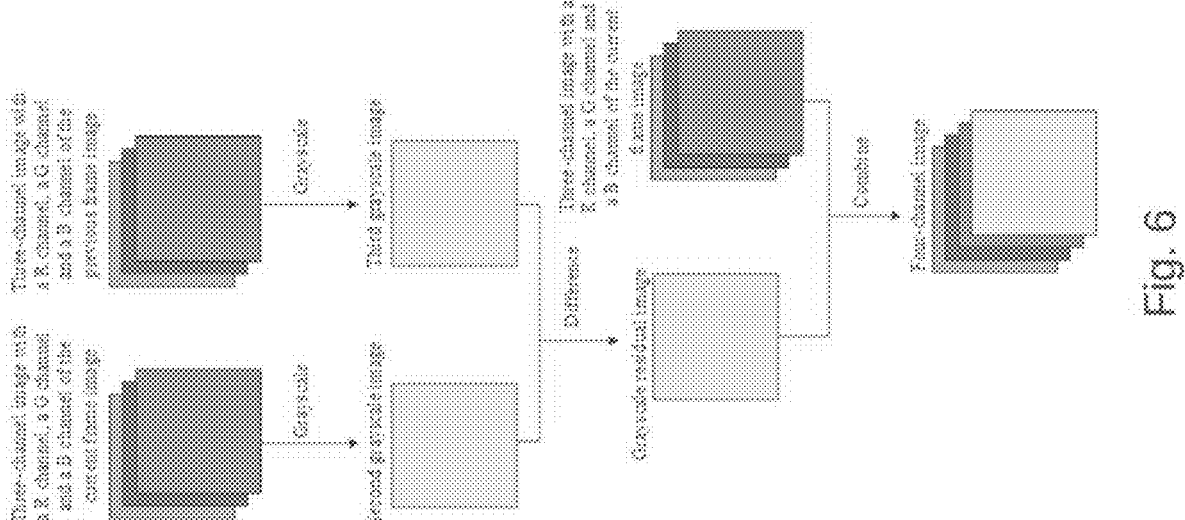
FIG. 6 is a schematic diagram of generating a multi-channel image with a continuous frame type according to an embodiment.

(2) Referring to FIG. 6, in a case that the to-be-detected image with the resolution of 112×112 has the continuous frame type, a second grayscale image of the to-be-detected image is determined. A previous frame image, adjacent to the to-be-detected image in the current frame, in a continuous frame sequence where the to-be-detected image in the current frame is located is acquired. A third grayscale image of the previous frame image is determined. The difference between the second grayscale image and the third grayscale image is determined as a grayscale residual image. The RGB three-channel image of the to-be-detected image in the current frame is combined with the grayscale residual image to generate a four-channel image with a resolution of 112×112.

Step S330, input the multi-channel image into a pre-trained key point detection model, where the pre-trained key point detection model includes a regression branch and an inter-frame residual branch which are parallel.

Before the detection process starts, the key point detection model may be pre-trained on the terminal 100 or an external device, and stored in the terminal 100. In this step, the terminal 100 may input the preprocessed multi-channel image into the trained key point detection model.

As will be discussed later, in the training process, the key point detection model includes the regression branch, the inter-frame residual branch and a type classification branch which are parallel, so that the regression branch, the inter-frame residual branch and the type classification branch in the key point detection model can be jointly trained to comprehensively determine layer weights in the regression branch, the inter-frame residual branch and the type classification branch. After the training process is completed, in the detection process, refer to the following steps S340 and S350, only output values of the regression branch and the inter-frame residual branch may be used to determine the coordinates of the key points, without using an output value of the type classification branch. Therefore, after the training process is completed, only the regression branch and the inter-frame residual branch are remained in and the type classification branch is removed from the generated key point detection model used for the detection process. That is, the pre-trained key point detection model in step S330 may only include the regression branch and the inter-frame residual branch, to save storage and computing resources. Alternatively, after the training process is completed, the regression branch, the inter-frame residual branch and the type classification branch may remain in the generated key point detection model used for the detection process. That is, the pre-trained key point detection model in step S330 may include the regression branch, the inter-frame residual branch and the type classification branch. When determining the coordinates of key points, the output values of the regression branch and the inter-frame residual branch are selected according to the type of the to-be-detected image, and the output value of the type classification branch is ignored.

A case that the generated key point detection model for the detection process includes the regression branch, the inter-frame residual branch and the type classification branch and the key points include 106 key points defined on the human face is taken as an example, the to-be-detected image with a resolution of 112×112 is inputted into the trained key point detection model, and after the forward transmission of the regression branch, the inter-frame residual branch and the type classification branch in the key point detection model, the regression branch outputs a regression prediction value Hloc being a 1×212 one-dimensional vector, the regression prediction value Hloc represents the position of the key point of regression. The inter-frame residual branch outputs a residual prediction value being a 1×212 one-dimensional vector, the residual prediction value represents a difference in key point positions between adjacent frames. The type classification branch outputs a 1×1 classification prediction value Hcls, the classification prediction value Hcls represents the type of the to-be-detected image.

Step S340, in a case that the type of the to-be-detected image is the discrete frame type, acquire a regression prediction value outputted by the regression branch and determine coordinates of multiple key points in the to-be-detected image based on the regression prediction value.

For example, referring to FIG. 4, if the to-be-detected image has the discrete frame type, in this step, the coordinates of the key points may be determined by using only the regression prediction value Hloc outputted by the regression branch. The regression prediction value Hloc is exemplarily a 1×212 one-dimensional vector. The one-dimensional vector has 212 components, and every two adjacent components form a two-dimensional coordinate in (x, y) format, thereby obtaining 106 first two-dimensional coordinates. The 106 first two-dimensional coordinates correspond to the coordinates of the 106 predefined key points in the human face respectively.

Step S350, in a case that the type of the to-be-detected image is the continuous frame type, acquire a regression prediction value outputted by the regression branch and a residual prediction value outputted by the inter-frame residual branch, and determine coordinates of multiple key points in the to-be-detected image based on the regression prediction value and the residual prediction value.

For example, referring to FIG. 4, if the to-be-detected image has the continuous frame type, in this step, the coordinates of the key points may be determined by using the regression prediction value Hloc outputted by the regression branch and the residual prediction value Hdiff outputted by the inter-frame residual branch. The regression prediction value Hloc is exemplarily a 1×212 one-dimensional vector. The one-dimensional vector has 212 components, and every two adjacent components form a two-dimensional coordinate in (x, y) format, thereby obtaining 106 first two-dimensional coordinates. Similarly, the residual prediction value Hdiff is a 1×212 one-dimensional vector. The one-dimensional vector has 212 components, and every two adjacent components form a two-dimensional coordinate in (x, y) format, thereby obtaining 106 second two-dimensional coordinates. The 106 first two-dimensional coordinates and the 106 second two-dimensional coordinates correspond to the coordinates of the 106 predefined key points in the human face respectively. In this way, each of the 106 predefined key points in the human face may correspond to one first two-dimensional coordinate and one second two-dimensional coordinate, so that the coordinate of each key point may be a third two-dimensional coordinate comprehensively determined according to the corresponding first two-dimensional coordinate and the corresponding second two-dimensional coordinate.

In one embodiment, in a case that the type of the to-be-detected image is the continuous frame type, step S350 of determining coordinates of multiple key points in the to-be-detected image based on the regression prediction value and the residual prediction value includes: taking the regression prediction value of the to-be-detected image as a direct regression value of the to-be-detected image; acquiring a regression prediction value outputted by the regression branch after a previous frame image adjacent to the to-be-detected image is inputted to the key point detection model, taking a sum of the regression prediction value of the previous frame image and the residual prediction value of the to-be-detected image as an estimated regression value of the to-be-detected image; calculating a weighted sum of the direct regression value and the estimated regression value as an estimated key point value of the to-be-detected image; and determining the coordinates of the multiple key points in the to-be-detected image based on the estimated key point value.

For example, in a case that the type of the to-be-detected image in the current frame is the continuous frame type, the estimated key point value of the to-be-detected image equals to a weighted sum of a direct regression value of the current frame and an estimated regression value of the current frame. The direct regression value of the current frame is the regression prediction value Hloc outputted by the regression branch of the current frame. The estimated regression value of the current frame is obtained by adding the regression prediction value Hloc outputted by the regression branch of the previous frame to the residual prediction value Hdiff outputted by the inter-frame residual branch of the current frame. The specific calculation may be represented by the following formula:

$$H_{f,k} = \alpha \times \overbrace{(H_{loc,k-1} + H_{diff,k})}^{Estimated\cdot regression\cdot value} + \beta \times \overbrace{H_{loc,k}}^{Direct\cdot regression\cdot value}$$

In the above formula, k represents the current frame (i.e., the k-th frame), $H_{f,k}$ represents the estimated key point value of the current frame, $H_{loc,k-1}$ represents the regression prediction value of the previous frame (i.e., the (k−1)-th frame), $H_{diff,k}$ represents the residual prediction value of the current frame, $H_{loc,k}$ represents the regression prediction value of the current frame. $\alpha$ and $\beta$ represent weights, and $\alpha+\beta=1$. The values of $\alpha$ and $\beta$ may be adjusted according to the situation, for example, $\alpha=0.5$ and $\beta=0.5$.

After the estimated key point value of the to-be-detected image in the current frame is determined through the above formula, the estimated key point value is exemplarily a 1×212 one-dimensional vector. The one-dimensional vector has 212 components, and every two adjacent components form a two-dimensional coordinate in (x, y) format, thereby obtaining 106 third two-dimensional coordinates. The 106 third two-dimensional coordinates correspond to the coordinates of the 106 predefined key points in the human face respectively.

In the method for detecting a key point of an image described above, a corresponding multi-channel image is generated based on the type of the to-be-detected image, so that the to-be-detected image with the discrete frame type and the to-be-detected image with the continuous frame type correspond to the multi-channel images with a unified format, and the same key point detection model is used to be compatible with the detection of the to-be-detected images with different types. During detecting, in a case that the type of the to-be-detected image is the discrete frame type, coordinates of the multiple key points in the to-be-detected image are determined based on the regression prediction value outputted by the regression branch, so as to accurately and efficiently detect the key points in the image with the discrete frame type; in a case that the type of the to-be-detected image is the continuous frame type, coordinates of the multiple key points in the to-be-detected image are determined based on the regression prediction value outputted by the regression branch and the residual prediction value outputted by the inter-frame residual branch, so as to consider the stability of the key point position between adjacent frames when detecting the position of the key point of the to-be-detected image, thereby avoiding excessive jumping of the key point position between adjacent frames. Therefore, the solution of the present disclosure can consider the key point detection for both the image with the discrete frame type and the image with the continuous frame type and can improve the stability of the key point detection results for adjacent frames of images with the continuous frame type.

In one embodiment, after the above step S310 and before step S320, the method for detecting a key point of an image further includes: performing contour enhancement processing on the to-be-detected image to generate a to-be-detected image with an enhanced contour.

Furthermore, the performing contour enhancement processing on the to-be-detected image to generate a to-bedetected image with an enhanced contour includes: perform contour texture extraction processing on the to-be-detected image by using a high-contrast preservation algorithm, to obtain a contour texture map; superimposing the contour texture map on the to-be-detected image by using a first strong light superposition algorithm, to obtain a contour texture deepening map; and superimposing the contour texture map on the contour texture deepening map by using a second strong light superposition algorithm, to generate the to-be-detected image with the enhanced contour.

Exemplarily, the above first strong light superposition algorithm is shown in the following formula:

$$src3 = \begin{cases} \dfrac{src1 * src2}{127.5} & \text{if } src1 < 127.5 \\ src2 + (255 - src2) * \dfrac{src1 * 127.5}{127.5} & \text{if } src1 \geq 127.5 \end{cases}$$

In the above formula, src3 represents a value of each pixel in the contour texture deepening map, src1 represents a value of a corresponding pixel in the to-be-detected image, and src2 represents a value of a corresponding pixel in the contour texture map.

Exemplarily, the above second strong light superposition algorithm is shown in the following formula:

$$Dst = \begin{cases} \dfrac{src3 * src2}{127.5} & \text{if } src3 < 127.5 \\ src2 + (255 - src2) * \dfrac{src3 * 127.5}{127.5} & \text{if } src3 \geq 127.5 \end{cases}$$

In the above formula, Dst represents a value of each pixel in the to-be-detected image with the enhanced contour, src3 represents a value of a corresponding pixel in the contour texture deepening map, and src2 represents a value of a corresponding pixel in the contour texture map.

When performing key point detection on an object such as a human face, if a contour corresponding to the key points of the object is not obvious, a detection accuracy of the key point may be affected, which may cause a large deviation of the key points detected near the contour. In the above-mentioned embodiments of the present disclosure, a boundary of the object contour is enhanced through the method of adding contrast enhancement. Firstly, a contour texture of facial features is extracted by the high-contrast preservation algorithm, then the contour texture is further deepened by performing the strong light superposition algorithm twice, and the contour texture is linearly superimposed to the to-be-detected image, to obtain the to-be-detected image with the enhanced contour. The to-be-detected image with the enhanced contour is used for the key point detection, so that a result of the key point detection in the contour area is more accurate and stable.

The above content describes the steps that the terminal 100 may perform in the detection process. In step S306 of the detection process, the pre-trained key point detection model is used. Therefore, a structure of the point detection model needs to be constructed in advance in the training process before the detection process, and the constructed point detection model is trained, and the layer weights of the key point detection model are optimized to obtain the trained key point detection model.

Figure 7:
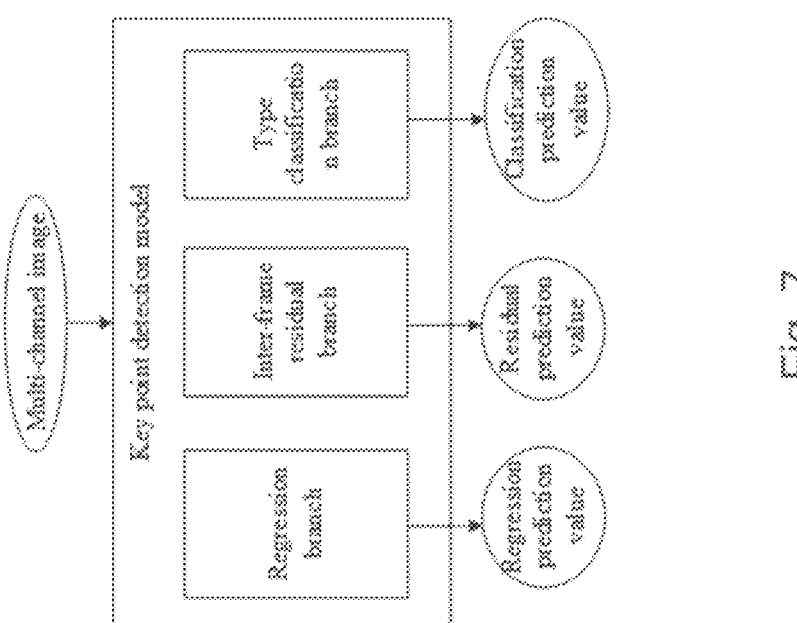
FIG. 7 is a schematic diagram of a key point detection model according to an embodiment.

In one embodiment, as shown in FIG. 7, in the training process, the key point detection model includes the regression branch, the inter-frame residual branch and the type classification branch which are parallel. The regression branch, the inter-frame residual branch and the type classification branch receive the preprocessed multi-channel image, and output the regression prediction value, the residual prediction value and the classification prediction value respectively. Through the regression branch, the inter-frame residual branch and the type classification branch set in parallel in the key point detection model in the training process, the trained key point detection model can take into account the regression of the key point positions of the image, inter-frame residual between adjacent frames of successive frames, and features of different types of images. As described above, in the detection process after the training process, the key point detection model may only include the regression branch and the inter-frame residual branch which are parallel, or may include the regression branch, the inter-frame residual branch and the type classification branch with only using the output values of the regression branch and the inter-frame residual branch.

In one embodiment, as shown in FIG. 8, in the training process, the key point detection model further includes a backbone network configured to receive the preprocessed multi-channel image, output an intermediate feature map, and feed the intermediate feature map into the regression branch, the inter-frame residual branch and the type classification branch. In this embodiment, by setting the backbone network shared among the regression branch, the inter-frame residual branch, and the type classification branch, feature extraction is performed on the multi-channel image through the backbone network in advance to obtain an intermediate feature map, and then the intermediate feature map is inputted to different branches to perform different prediction operations, in this way, the feature extraction efficiency of the multi-channel image can be effectively improved and an overall operation efficiency of the model is improved. It can be understood that, if the key point detection model includes the backbone network in the training process, in the detection process after the training process, the key point detection model also includes the backbone network.

In one embodiment, the regression branch includes multiple first convolutional neural network layers (Conv), a flattening layer (Flatten) and a first fully connected layer (FC) in series; the inter-frame residual branch includes multiple second convolutional neural network layers, a flattening layer and a second fully connected layer in series; and the type classification branch includes multiple third convolutional neural network layers, a flattening layer and a third fully connected layer in series.

Exemplarily, as shown in FIG. 9, each of the regression branch, the inter-frame residual branch and the type classification branch may have two serial convolutional neural network layers. In other embodiments, each branch may have a different number of convolutional neural network layers.

In one embodiment, each of the first fully connected layer and the second fully connected layer includes a first number of output neurons, and the first number depends on a total number of the multiple key points.

Specifically, the first number may be equal to a value obtained by multiplying the total number of key points by the number of parameters of the coordinate of each key point.

For example, as shown in FIG. 9, in a case that the defined key points include 106 key points, the coordinate $(x, y)$ of each key point has two parameters $x$ and $y$, in this case, the coordinates of 106 key points need to be determined by 106

$\lambda 2=212$ parameters. Therefore, it may be designed that the first fully connected layer has 212 output neurons, and the second fully connected layer also has 212 output neurons.

In one embodiment, the third fully connected layer includes a second number of output neurons, and the second number depends on a type of a loss function in the type classification branch.

For example, as shown in FIG. 9, in a case that an activation function of the type classification branch is the Sigmoid activation function and the loss function is the Binary Cross Entropy Loss function, the third fully connected layer has a single output neuron. In this case, the classification prediction value Hcls outputted by the third fully connected layer includes an output value of the single output neuron, and the output value of the single output neuron represents a probability $y1$ that the to-be-detected image has the discrete frame type, $0 \leq y1 \leq 1$. By comparing the probability $y1$ with a given threshold T, the type of the to-be-detected image may be determined. In a case that $y1$ it may be determined that the to-be-detected image has the discrete frame type. In a case that $y1 \leq T$, it may be determined that the to-be-detected image has the continuous frame type. Alternatively, the output value of the single output neuron may represent a probability $y1$ that the to-be-detected image has the continuous frame type. In a case that $y1 \geq T$, it may be determined that the to-be-detected image has the continuous frame type. In a case that $y1 < T$, it may be determined that the to-be-detected image has the discrete frame type. T may take 0.5 as an example.

In another example, in a case that the activation function of the type classification branch is the Softmax activation function and the loss function is the Categorical Cross Entropy Loss function, the third fully connected layer may have two output neurons. In this case, the classification prediction value Hcls outputted by the third fully connected layer includes two output values of the two output neurons. The output value of one output neuron represents a probability $y2$ that the to-be-detected image has the discrete frame type, $0 \leq y2 \leq 1$. The output value of the other output neuron represents a probability $y3$ that the to-be-detected image has the continuous frame type, $0 \leq y3 \leq 1$. The sum $(y2+y3)$ of these two probabilities has a value of 1. In a case that $y2 \geq y3$, it may be determined that the to-be-detected image has the discrete frame type. In a case that $y2 < y3$, it may be determined that the to-be-detected image has the continuous frame type.

In a specific example, as shown in FIG. 9, the key point detection model includes a backbone network, a regression branch, an inter-frame residual branch and a type classification branch. Each of the regression branch, the inter-frame residual branch and the type classification branch is connected serially with the backbone network. The regression branch, the inter-frame residual branch and the type classification branch are parallel to each other. The backbone network receives the to-be-detected image, outputs an intermediate feature map, and feeds the intermediate feature map into the regression branch, the inter-frame residual branch and the type classification branch. The regression branch, the inter-frame residual branch and the type classification branch respectively output a regression prediction value, a residual prediction value and a classification prediction value.

Referring to FIG. 9, the backbone network is used to perform preliminary feature extraction on the inputted to-be-detected image. The backbone network may include several serial and/or parallel convolutional neural network layers. The backbone network may also include several pooling layers, batch normalization layers, and other layers. Exemplarily, the backbone network may include a lightweight network V2 (MobileNetV2, see MobileNetV2: Inverted Residuals and Linear Bottlenecks, Mark Sandler, et.al., The IEEE Conference on Computer Vision and Pattern Recognition (CVPR), 2018, pp. 4510-4520). It may be understood that, the backbone network may have many different structures, as long as the preliminary feature extraction on the to-be-detected image can be realized and a size and channel number of the outputted feature map are matched with the subsequent input terminals of the regression branch, the inter-frame residual branch and the type classification branch. The structure of the backbone network is not limited in this disclosure. For example, the to-be-detected image is a four-channel image with a resolution of 112×112 (which may be expressed as "1×112×112×4"). After the four-channel image with a resolution of 112×112 is inputted into the backbone network, a 256-channel image with a resolution of 7×7 (which may be expressed as "1×7×7×256") are outputted, and the 256-channel image with a resolution of 7×7 is the intermediate feature map.

For example, as shown in FIG. 9, the regression branch includes two first convolutional neural network layers, a flattening layer, and a first fully connected layer in series. A dimension of each first convolutional neural network layer is "256×3×3×256", which means that a filter depth of each first convolutional neural network layer is 256 (the filter depth is determined by the number of channels of the input image of this layer), a size of the convolution kernel is 3×3, and the number of the filters is 256 (the number of channels of the output map of this layer depends on the number of the filters), and the stride is 2. A 256-channel image with a resolution of 7×7 is inputted to the first first convolutional neural network layer, and after the convolution operation performed by the first first convolutional neural network layer, a 256-channel image with a resolution of 4×4 is obtained. The 256-channel image with a resolution of 4×4 is inputted to the second first convolutional neural network layer, and after the convolution operation performed by the second first convolutional neural network layer, a 256-channel image with a resolution of 1×1 is obtained. Then the 256-channel image with a resolution of 1×1 is flattened by the flattening layer to obtain a 1×256 one-dimensional vector. The dimension of the first fully connected layer is "256×212", which means that the number of input parameters of the first fully connected layer is 256 and the first fully connected layer have 212 neurons (the number of output parameters of this layer depends on the number of neurons). The 1×256 one-dimensional vector is inputted to the first fully connected layer and then the first fully connected layer outputs a 1×212 one-dimensional vector. The 1×212 one-dimensional vector is the regression prediction value Hloc.

The inter-frame residual branch has a structure similar to that of the regression branch. The inter-frame residual branch includes two second convolutional neural network layers, a flattening layer, and a second fully connected layer in series. Similarly, the dimension of each second convolutional neural network layer is "256×3×3×256", the stride is 2, and the dimension of the second fully connected layer is "256×212". Similar with the above regression branch, a 256-channel image with a resolution of 7×7 is inputted to the inter-frame residual branch, after the operations performed by two second convolutional neural network layers, the flattening layer and the second fully connected layer, a 1×212 one-dimensional vector is outputted. The 1×212 one-dimensional vector is the residual prediction value Hdiff.

Similarly, the type classification branch includes two third convolutional neural network layers, a flattening layer, and a third fully connected layer in series. The dimension of each third convolutional neural network layer is "256×3×3×256", the stride is 2. The dimension of the third fully connected layer is "256×1", which means that the number of the input parameters of the third fully connected layer is 256, and the third fully connected layer has 1 neuron (the number of output parameters of this layer depends on the number of neurons). The activation function of the third fully connected layer is the Sigmoid activation function. A 256-channel image with a resolution of 7×7 is inputted into the inter-frame residual branch, after the operations performed by two second convolutional neural network layers and the flattening layer, a 1×256 one-dimensional vector is obtained. The 1×256 one-dimensional vector is inputted into the third fully connected layer, then a 1×1 one-dimensional vector (a single parameter, namely the probability y1) is outputted. The 1×1 one-dimensional vector is the classification prediction value Hcls.

Forward propagation and backward propagation are basic processes that a neural network may perform during a testing process and a training process. In the model training process, the forward propagation and the back propagation are repeatedly performed on the model by using the training set data to optimize layer weights and determine the trained model. In the model detection process, the model performs the forward propagation on the input data to output a prediction result. The forward propagation describes a process of how the input of the neural network is forward transmitted and processed along each layer of the neural network to obtain the output. The backward propagation describes a process of, after the loss function is determined through the forward propagation, how to perform the backward transmission along each layer of the neural network and derive an error of each layer to adjust the layer weight of each layer.

For example, the above process of, inputting the multi-channel image into the key point detection model, obtaining the intermediate feature map through the backbone network, inputting the intermediate feature map into the regression branch, the inter-frame residual branch and the type classification branch and outputting the regression prediction value, the residual prediction value and the classification prediction value respectively by the regression branch, the inter-frame residual branch and the type classification branch, is the forward propagation of the key point detection model. A basic principle of the backward propagation of the key point detection model in this disclosure is similar to that of the backward propagation of the existing convolutional neural network. The backward propagation of the key point detection model in this disclosure can be understood by the person skilled in the art based on the principle of the backward propagation of the existing convolutional neural network and the structure of the key point detection model in this disclosure. Therefore, the backward propagation of the key point detection model in this disclosure is not described here.

In the training process, the trained key point detection model can be determined by training the key point detection model with the above structure.

In one embodiment, as shown in FIG. 10 and FIG. 11, before acquiring the to-be-detected image, the training process of the key point detection model further includes steps S1010 to S1040.

Step S1010, acquire a training set. The training set includes multiple multi-channel images with the discrete frame type, a true value (i.e., Ground Truth, GT) of each multi-channel image with the discrete frame type, multiple multi-channel images with the continuous frame type and a true value of each multi-channel image with the continuous frame type.

In one embodiment, step 1010 includes step S1011 and step S1012. Step S1011 includes: acquiring a discrete frame set, the discrete frame set including multiple discrete frame images; generating multiple multi-channel images with the discrete frame type corresponding to the multiple discrete frame images; and determining a true value of each multi-channel image with the discrete frame type. Step S1012 includes: acquiring a continuous frame set, the continuous frame set including multiple continuous frame images; generating multiple multi-channel images with the continuous frame type corresponding to the multiple continuous frame images; and determining a true value of each multi-channel image with the continuous frame type.

It may be understood that, the multi-channel image with the discrete frame type and the multi-channel image with the continuous frame type in the training set in this step may have the same resolution, the same image mode and the same channel number as the multi-channel image with the discrete frame type and the multi-channel image with the continuous frame type in the above detection process, and may be obtained by performing the same preprocessing as in the detection process on the discrete frame images and the continuous frame images.

In one embodiment, the true value of each multi-channel image with the discrete frame type in the training set includes a regression true value of the regression branch and a classification true value of the type classification branch; and the true value of each multi-channel image with the continuous frame type in the training set includes a regression true value of the regression branch, a residual true value of the inter-frame residual branch and a classification true value of the type classification branch.

In one embodiment, step S1011 includes: acquiring a discrete frame set, the discrete frame set including multiple discrete frame images that have no contextual association with each other. Each of the multiple discrete frame images includes an object of interest, and has the same resolution and the same image mode as the to-be-detected image. For example, each discrete frame image may be similarly obtained by performing object detection on the acquired original image, cropping a sub-image and resizing the sub-image to a target size. Then, one discrete frame image is extracted from the discrete frame set, and a zero-value image with a value of each pixel value being zero is generated. The zero-value image is combined with the extracted discrete frame image to form a discrete frame pair. The above operation is repeated until all discrete frame images in the discrete frame set are extracted, to obtain N1 discrete frame pairs. In each discrete frame pair, the actual captured discrete frame image is defined as Fcur, and the generated zero-value image is defined as Fhis. For each discrete frame pair, a single-channel first grayscale image with each pixel value being zero is generated as the grayscale residual image, the multi-color channel image of Fcur is combined with the grayscale residual image to generate a multi-channel image, as shown in FIG. 5, so as to generate N1 multi-channel images. For each multi-channel image, the true value GT of the multi-channel image is calibrated manually or identified by known tools. The true value GT includes the regression true value GTloc of the regression branch and the classification true value GTcls of the type classification branch.

For example, each discrete frame image in the discrete frame set is a three-channel image with a resolution of 112×112 which has a red channel, a green channel, and a blue channel, and each multi-channel image with the discrete frame type is a four-channel image with a resolution of 112×112 which has a red channel, a green channel, a blue channel, and a grayscale residual channel. The defined key points include 106 key points, then the 106 coordinates (x, y) of the 106 key points in one frame image Fcur may be calibrated manually or calibrated by tools, and the 106 coordinates (x, y) are arranged in sequence to form a 1×212 one-dimensional vector as the regression true value GTloc of the multi-channel image with the discrete frame type. In a case that the classification prediction value Hcls outputted by the third fully connected layer in FIG. 9 includes the output value of a single output neuron and the output value of the single output neuron represents the probability y1 that the input image has the discrete frame type, the classification true value GTcls of the multi-channel image with the discrete frame type is y1=1.

In one embodiment, step S1012 includes: acquiring a continuous frame set, the continuous frame set including multiple continuous frame images that have contextual association with each other. Each of the multiple continuous frame images includes an object of interest, and has the same resolution and the same image mode as the to-be-detected image. For example, each continuous frame image may be similarly obtained by performing object detection on the acquired original image, cropping a sub-image and resizing the sub-image to a target size. Then, two adjacent continuous frame images are extracted from the continuous frame set to form a continuous frame pair. The above operation is repeated until all continuous frame images in the continuous frame set are extracted, to obtain N2 continuous frame pairs. In each continuous frame pair, the latter continuous frame image is defined as Fcur, and the former continuous frame image is defined as Fhis. For each continuous frame pair, the grayscale of Fcur is taken to generate a second grayscale image, the grayscale of Fhis is taken to generate a third grayscale image, a difference between the second grayscale image and the third grayscale image is determined as the grayscale residual image. The multi-color channel image of Fcur is combined with the grayscale residual image to generate a multi-channel image, as shown in FIG. 6, so as to generate N2 multi-channel images. For each multi-channel image, the true value GT of the multi-channel image is calibrated manually or identified by known tools. The true value GT includes the regression true value GTloc of the regression branch, the residual true value GTdiff of the grayscale residual image and the classification true value GTcls of the type classification branch.

For example, each continuous frame image in the continuous frame set is a three-channel image with a resolution of 112×112 which has a red channel, a green channel, and a blue channel, and each multi-channel image with the continuous frame type is a four-channel image with a resolution of 112×112 which has a red channel, a green channel, a blue channel, and a grayscale residual channel. The defined key points include 106 key points, then the 106 coordinates (x, y) of the 106 key points in the latter continuous frame image Fcur in a continuous frame pair, corresponding to the multi-channel image with the continuous frame type, may be calibrated manually or calibrated by tools, and the 106 coordinates (x, y) are arranged in sequence to form a 1×212 one-dimensional vector as the regression true value GTloc of the multi-channel image with the continuous frame type. The 106 coordinates (x, y) of the 106 key points in the former continuous frame image Fhis in the continuous frame pair are calibrated, and the 106 coordinates (x, y) are arranged in sequence to form a 1×212 one-dimensional vector as a history regression true value GThis of the multi-channel image with the continuous frame type. The residual true value of the grayscale residual image corresponding to the multi-channel image with the continuous frame type is determined as GTdiff=GTloc−GThis. In a case that the classification prediction value Hcls outputted by the third fully connected layer in FIG. 9 includes the output value of a single output neuron and the output value of the single output neuron represents the probability y1 that the input image has the discrete frame type, the classification true value GTcls of the multi-channel image with the discrete frame type is y1=0.

Furthermore, in one embodiment, changes may be performed on a single-frame image to generate the continuous frame images in a simulation manner, thereby improving the efficiency. Accordingly, step S1012 may include: acquiring a single-frame image, and determining a true value of a multi-channel image generated based on the single-frame image; performing continuous illumination processing, color processing and/or deformation processing on the single-frame image, to generate multiple continuous frame images in a simulation manner; performing preprocessing on each of the multiple continuous frame images to generate the multiple multi-channel images with the continuous frame type; and determining the true value of the multi-channel image with the continuous frame type, generated based on each of the multiple continuous frame images, based on a deformation amount between the multiple continuous frame images and the single-frame image and the true value of the multi-channel image generated based on the single-frame image.

For the determination of the true value in this embodiment, specifically, the position of each key point in the original single-frame image may be calibrated; the position of each key point in each continuous frame image generated in the simulation manner may be determined based on the deformation amount between the continuous frame images generated in the simulation manner and the single-frame image and based on the position of each key point in the original single-frame image. Then, according to the method described in the above-mentioned embodiments, the multiple multi-channel images with the continuous frame type and the true value of each multi-channel image with the continuous frame type may be determined from the continuous frame image set including the original single-frame image and the continuous frame images generated in the simulation manner.

Compared with the traditional method of acquiring continuous frame images from a video and determining the true value of each frame image, in this embodiment, changes are performed on the single-frame image to generate the continuous frame image set in a simulation manner, the true value of the multi-channel image of other continuous frame images can be quickly determined based on the deformation amount between the continuous frame images and the single-frame image, so that the multiple multi-channel images with the continuous frame type and the true value of each multi-channel image with the continuous frame type can be generated more quickly and efficiently.

Step S1020, initialize layer weights in the key point detection model.

In this step, the layer weight for each layer in the key point detection model is initialized.

Step S1030, iteratively perform, by using the training set, forward propagation for calculating a total loss function and backward propagation for updating the layer weights on the key point detection model until a value of the total loss function converges, to determine trained layer weights. The multi-channel images with the discrete frame type are used for training the layer weights in the regression branch and the type classification branch, and the multi-channel images with the continuous frame type are used for training the layer weights in the regression branch, the inter-frame residual branch and the type classification branch.

The case that the value of the total loss function converges may refer to that the loss value calculated by the total loss function falls within an expected loss value range or the number of iterations reaches a predetermined number of times.

In one embodiment, the regression branch includes a first loss function for representing a difference between the regression prediction value outputted by the regression branch and the regression true value; the inter-frame residual branch includes a second loss function for representing a difference between the residual prediction value outputted by the inter-frame residual branch and the residual true value; and the type classification branch includes a third loss function for representing a difference between a classification prediction value outputted by the type classification branch and the classification true value.

As an example, training data in the training set may be divided into multiple batches. The forward propagation for calculating the total loss function and the backward propagation for updating the layer weights are iteratively performed on the key point detection model by using each batch of the training set, until the value of the total loss function converges.

Exemplarily, for a single batch, the first loss function Lloc of the regression branch may be a smooth L1 loss function (Smooth L1 Loss), and the first loss function Lloc is defined as follows:

$$x = GT_{loc} - H_{loc}$$

$$L_{loc} = \frac{1}{n}\sum_{i=0}^{n}\left\{ \begin{array}{ll} 0.5x^2 & \text{if } |x| < 1 \\ |x|-0.5 & \text{otherwise} \end{array} \right.$$

In the above formula, n is the total number of multi-channel images in this batch, GTloc is the regression true value of each multi-channel image in the batch, and Hloc is the regression prediction value of each multi-channel image in this batch.

For a single batch, the second loss function Ldiff of the inter-frame residual branch may also be a smooth L1 loss function (Smooth L1 Loss), and the second loss function Ldiff is defined as follows:

$$x = GT_{diff} - H_{diff}$$

$$L_{diff} = \frac{1}{n}\sum_{i=0}^{n}\left\{ \begin{array}{ll} 0.5x^2 & \text{if } |x| < 1 \\ |x|-0.5 & \text{otherwise} \end{array} \right.$$

In the above formula, n is the total amount of multi-channel images in this batch, GTdiff is the residual true value of each multi-channel image in this batch, Hdiff is the residual prediction value of each multi-channel image in this batch.

For a single batch, the third loss function Lcls of the type classification branch may be a Binary Cross Entropy Loss function, and the third loss function Lcls is defined as follows:

$$L_{cls} = -\frac{1}{n}\sum_{i=0}^{n}[GT_{cls} \cdot \ln(\mathrm{sigmoid}(H_{cls})) + (1 - GT_{cls})\ln(1 - \mathrm{sigmoid}(H_{cls}))]$$

In the above formula, n is the total number of multi-channel images in this batch, GTcls is the classification true value of each multi-channel image in this batch, and Hcls is the classification prediction value of each multi-channel image in this batch.

In one embodiment, the total loss function of the key point detection model is determined based on the first loss function and the third loss function, in a case that the key point detection model is trained by using the multi-channel images with the discrete frame type; and the total loss function of the key point detection model is determined based on the first loss function, the second loss function and the third loss function, in a case that the key point detection model is trained by using the multi-channel images with the continuous frame type.

The total loss function Ltotal of the key point detection model is defined as follows:

$$L_{total} = \begin{cases} L_{loc} + L_{cls} & \text{Discrete frame type} \\ L_{loc} + L_{diff} + L_{cls} & \text{Continuous frame type} \end{cases}$$

In the above formula, Lloc is used to ensure the prediction accuracy of the key point detection model, Ldiff is used to ensure the stability of the key point detection model when the to-be-detected image with the continuous frame type is predicted, and Lcls is used to enable the key point detection model to automatically determine the type of the current input image.

In the above embodiment, for example, in step S1030, the key point detection model is trained by using different total loss functions according to different types of the training data, which may require the key point detection model to know the type of inputted training data before step S1030. In one embodiment, the key point detection model may determine the type of the multi-channel image used for training based on the classification prediction value outputted by the type classification branch. For example, in a case that the activation function of the type classification branch is a Sigmoid activation function and the loss function is a Binary Cross Entropy Loss function, the classification prediction value Hcls outputted by the type classification branch may be a probability y1 that the to-be-detected image has the discrete frame type, $0 \leq y1 \leq 1$. When $y1 \geq T$, it may be determined that the multi-channel image used for training has the discrete frame type. When $y1 < T$, it may be determined that the multi-channel image used for training has the continuous frame type. T may take 0.5 as an example. In any step in the above embodiments, the key point detection model or the terminal 100 may also determine, according to the requirement, the type of the multi-channel image inputted to the model based on the classification prediction value outputted by the type classification branch.

Step S1040, determine the pre-trained key point detection model based on the trained layer weights.

Through the training performed by the foregoing steps, the optimized layer weights may be determined. The key point detection model defined by the optimized layer weights is the trained key point detection model. The trained key point detection model may be stored in the terminal 100, so as to be called in a subsequent detection process to detect positions of the key points in the to-be-detected image.

After step S310 and before step S320 of the above-mentioned detection process, the method for detecting a key point of an image also includes performing contour enhancement processing on the to-be-detected image, to generate a to-be-detected image with an enhanced contour. Correspondingly, in step S1010 of the training process, the contour enhancement processing may also be performed on each image in the training set to further improve the accuracy of the key point detection model.

In one embodiment, after acquiring the discrete frame set in the above step S1011 and before generating the multi-channel image, the training process further includes the step of performing the contour enhancement processing on each discrete frame image to generate the discrete frame image with the enhanced contour. After acquiring the continuous frame set in the above step S1012 and before generating the multi-channel image, the training process further includes the step of performing the contour enhancement processing on each continuous frame image to generate the continuous frame image with the enhanced contour.

In this embodiment, during the training process, the step of performing the contour enhancement processing on each discrete frame image to generate the discrete frame image with the enhanced contour and the step of performing the contour enhancement processing on each continuous frame image to generate the continuous frame image with the enhanced contour is similar to the step of performing the contour enhancement processing on the to-be-detected image to generate the to-be-detected image with the enhanced contour in the detection process, therefore details are not repeated here.

It should be understood that although the steps in the flow charts of FIG. 3 and FIG. 10 are shown sequentially as indicated by the arrows, these steps are not necessarily executed sequentially in the order indicated by the arrows. Unless otherwise specified herein, there is no strict order restriction on the execution of these steps, and these steps may be executed in other orders. Moreover, at least some of the steps in FIG. 3 and FIG. 10 may include multiple sub-steps or multiple stages. These sub-steps or stages are not necessarily executed at the same time, but may be executed at different times. These sub-steps or the stages are not necessarily performed sequentially, but may be executed alternately with at least a part of other steps or sub-steps or stages of other steps.

In one embodiment, as shown in FIG. 12, an apparatus 1200 for detecting a key point of an image is provided. The apparatus includes an image acquiring module 1210, a preprocessing module 1220, a model predicting module 1230 and a key point determining module 1240.

The image acquiring module 1210 is configured to acquire a to-be-detected image.

The preprocessing module 1220 is configured to perform, based on a type of the to-be-detected image, preprocessing on the to-be-detected image to generate a multi-channel image with the type, where the type includes a discrete frame type or a continuous frame type.

The model predicting module 1230 is configured to input the multi-channel image into a pre-trained key point detection model, where the pre-trained key point detection model includes a regression branch and an inter-frame residual branch which are parallel.

The key point determining module 1240 is configured to: in a case that the type of the to-be-detected image is the discrete frame type, acquire a regression prediction value outputted by the regression branch and determine coordinates of multiple key points in the to-be-detected image based on the regression prediction value; and in a case that the type of the to-be-detected image is the continuous frame type, acquire a regression prediction value outputted by the regression branch and a residual prediction value outputted by the inter-frame residual branch, and determine coordinates of multiple key points in the to-be-detected image based on the regression prediction value and the residual prediction value.

For the specific descriptions of the apparatus 1200 for detecting a key point of an image, one can refer to the above-mentioned descriptions of the method for detecting a key point of an image, which are be repeated here. Modules in the above-mentioned apparatus 1200 for detecting a key point of an image may be fully or partially implemented by software, hardware and a combination thereof. The above-mentioned modules may be embedded in or independent of the processor in the computer device in the form of hardware, and may also be stored in the memory of the computer device in the form of software, so that the processor can invoke and execute the corresponding operations of the above-mentioned modules.

In one embodiment, a computer device is provided. The computer device may be a terminal 100. The internal structure of the computer device may be as shown in FIG. 13. The computer device includes a processor, a memory, a network interface, a display screen and an input apparatus connected through a system bus. The processor of the computer device is used to provide calculation and control capabilities. The memory of the computer device includes a non-volatile storage medium and an internal memory. The non-volatile storage medium stores an operating system and computer programs. The internal memory provides an environment for the operation of the operating system and the computer programs in the non-volatile storage medium. The network interface of the computer device is used to communicate with an external terminal via a network connection. When the computer programs are executed by the processor, the method for detecting a key point of an image is performed. The display screen of the computer device may be a liquid crystal display screen or an electronic ink display screen. The input apparatus of the computer device may be a touch layer covered on the display screen, or a button, a trackball or a touch pad provided on the casing of the computer device, and may also be an external keyboard, touchpad, or mouse or the like.

Those skilled in the art can understand that the structure shown in FIG. 13 is only a block diagram of a part of the structure related to the solution of this disclosure and does not constitute a limitation on the computer device on which the solution of this disclosure is applied. The specific computer device may include more or fewer components than the components shown in the figures, or some components may be combined, or the computer device may have a different arrangement of components.

In one embodiment, a computer device is provided. The computer device includes a memory and a processor. The memory stores a computer program. The processor, when executing the computer program, implements the following steps:

acquiring a to-be-detected image;

performing, based on a type of the to-be-detected image, preprocessing on the to-be-detected image to generate a multi-channel image with the type, where the type includes a discrete frame type or a continuous frame type;

inputting the multi-channel image into a pre-trained key point detection model, where the pre-trained key point detection model includes a regression branch and an inter-frame residual branch which are parallel;

in a case that the type of the to-be-detected image is the discrete frame type, acquiring a regression prediction value outputted by the regression branch and determining coordinates of multiple key points in the to-be-detected image based on the regression prediction value; and in a case that the type of the to-be-detected image is the continuous frame type, acquiring a regression prediction value outputted by the regression branch and a residual prediction value outputted by the inter-frame residual branch, and determining coordinates of multiple key points in the to-be-detected image based on the regression prediction value and the residual prediction value.

In other embodiments, the processor, when executing the computer program, further implements the steps of the method for detecting a key point of an image in any of the above embodiments.

In one embodiment, a computer-readable storage medium is provided. The computer-readable storage medium stores a computer program. The computer program, when executed by a processor, implements the following steps:

acquiring a to-be-detected image;

performing, based on a type of the to-be-detected image, preprocessing on the to-be-detected image to generate a multi-channel image with the type, where the type includes a discrete frame type or a continuous frame type;

inputting the multi-channel image into a pre-trained key point detection model, where the pre-trained key point detection model includes a regression branch and an inter-frame residual branch which are parallel;

in a case that the type of the to-be-detected image is the discrete frame type, acquiring a regression prediction value outputted by the regression branch and determining coordinates of multiple key points in the to-be-detected image based on the regression prediction value; and in a case that the type of the to-be-detected image is the continuous frame type, acquiring a regression prediction value outputted by the regression branch and a residual prediction value outputted by the inter-frame residual branch, and determining coordinates of multiple key points in the to-be-detected image based on the regression prediction value and the residual prediction value.

In other embodiments, the computer program, when executed by a processor, implements the steps of the method for detecting a key point of an image in any of the above embodiments.

Those of ordinary skill in the art may understand that all or part of the processes in the methods of the above embodiments may be implemented through computer programs to instruct related hardware, and the computer programs may be stored in a non-volatile computer-readable storage medium. The computer program, when executed, may include the processes of the methods in the above-mentioned embodiments. Any references to memory, storage, database or other media used in the various embodiments provided in the present disclosure may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM).

The technical features of the above embodiments may be combined arbitrarily. To make the description concise, not all possible combinations of the technical features in the above embodiments are described. However, as long as there is no contradiction in the combination of these technical features, the combination of these technical features should be considered to be within the range described in this specification. It should be noted that those skilled in the art can make several modifications and improvements without departing from the concept of the present disclosure, and these all belong to the protection scope of the present disclosure. Therefore, the protection scope of the disclosure should be based on the appended claims.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A method for detecting a key point of an image, the method comprising:

acquiring a to-be-detected image;

performing, based on a type of the to-be-detected image, preprocessing on the to-be-detected image to generate a multi-channel image with the type of the to-be-detected image, wherein the type of the to-be-detected image comprises a discrete frame type or a continuous frame type;

inputting the multi-channel image into a pre-trained key point detection model, wherein the pre-trained key point detection model comprises a regression branch and an inter-frame residual branch which are parallel;

in a case that the type of the to-be-detected image is the discrete frame type, acquiring a regression prediction value outputted by the regression branch and determining coordinates of a plurality of key points in the to-be-detected image based on the regression prediction value;

in a case that the type of the to-be-detected image is the continuous frame type, acquiring a regression prediction value outputted by the regression branch and a residual prediction value outputted by the inter-frame residual branch, and determining coordinates of a plurality of key points in the to-be-detected image based on the regression prediction value and the residual prediction value; and wherein, in a training process of the key point detection model, the key point detection model comprises the regression branch, the inter-frame residual branch and a type classification branch which are parallel.

2. The method according to claim 1, wherein the to-be-detected image is a multi-color channel image, and the performing, based on a type of the to-be-detected image, preprocessing on the to-be-detected image to generate a multi-channel image with the type comprises:

in a case that the type of the to-be-detected image is the discrete frame type, generating a first grayscale image, with a same resolution as the to-be-detected image and with a value of each pixel value being zero, as a grayscale residual image, combining the multi-color channel image with the grayscale residual image to generate a multi-channel image with the discrete frame type; and in a case that the type of the to-be-detected image is the continuous frame type, determining a second grayscale image of the to-be-detected image, acquiring a previous frame image adjacent to the to-be-detected image, determining a third grayscale image of the previous frame image, determining a difference between the second grayscale image and the third grayscale image as a grayscale residual image, and combining the multi-color channel image with the grayscale residual image to generate a multi-channel image with the continuous frame type.

3. The method according to claim 2, wherein the multi-color channel image is a three-channel image with a red channel, a green channel and a blue channel, and the generated multi-channel image is a four-channel image with a red channel, a green channel, a blue channel, and a grayscale residual channel.

4. The method according to claim 1, wherein in a case that the type of the to-be-detected image is the continuous frame type, the determining coordinates of a plurality of key points in the to-be-detected image based on the regression prediction value and the residual prediction value comprises:

taking the regression prediction value of the to-be-detected image as a direct regression value of the to-be-detected image;

acquiring a regression prediction value outputted by the regression branch after a previous frame image adjacent to the to-be-detected image is inputted to the key point detection model, taking a sum of the regression prediction value of the previous frame image and the residual prediction value of the to-be-detected image as an estimated regression value of the to-be-detected image;

calculating a weighted sum of the direct regression value and the estimated regression value as an estimated key point value of the to-be-detected image; and determining the coordinates of the plurality of key points in the to-be-detected image based on the estimated key point value.

5. The method according to claim 1, wherein before performing, based on the type of the to-be-detected image, preprocessing on the to-be-detected image to generate the multi-channel image with the type, the method further comprises:

performing contour enhancement processing on the to-be-detected image to generate a to-be-detected image with an enhanced contour.

6. The method according to claim 1, wherein, in the training process, the key point detection model further comprises a backbone network configured to receive the multi-channel image, output an intermediate feature map, and feed the intermediate feature map into the regression branch, the inter-frame residual branch, and the type classification branch.

7. The method according to claim 1, wherein
the regression branch comprises a plurality of first convolutional neural network layers, a flattening layer and a first fully connected layer in series;
the inter-frame residual branch comprises a plurality of second convolutional neural network layers, a flattening layer and a second fully connected layer in series; and
the type classification branch comprises a plurality of third convolutional neural network layers, a flattening layer and a third fully connected layer in series.

8. The method according to claim 7, wherein each of the first fully connected layer and the second fully connected layer comprises a first number of output neurons, and the first number depends on a total number of the plurality of key points; and/or the third fully connected layer comprises a second number of output neurons, and the second number depends on a type of a loss function in the type classification branch.

9. The method according to claim 6, wherein before acquiring the to-be-detected image, the training process of the key point detection model comprises:
acquiring a training set, wherein the training set comprises a plurality of multi-channel images with the discrete frame type, a true value of each multi-channel image with the discrete frame type, a plurality of multi-channel images with the continuous frame type and a true value of each multi-channel image with the continuous frame type;
initializing layer weights in the key point detection model;
iteratively performing, by using the training set, forward propagation for calculating a total loss function and backward propagation for updating the layer weights on the key point detection model until a value of the total loss function converges, to determine trained layer weights, wherein the multi-channel images with the discrete frame type are used for training the layer weights in the regression branch and the type classification branch, and the multi-channel images with the continuous frame type are used for training the layer weights in the regression branch, the inter-frame residual branch and the type classification branch; and
determining the pre-trained key point detection model based on the trained layer weights.

10. The method according to claim 9, wherein acquiring the plurality of multi-channel images with the continuous frame type and the true value of each multi-channel image with the continuous frame type comprises:
acquiring a single-frame image, and determining a true value of a multi-channel image generated based on the single-frame image;
performing continuous illumination processing, color processing and/or deformation processing on the single-frame image, to generate a plurality of continuous frame images in a simulation manner;

28 performing preprocessing on each of the plurality of continuous frame images to generate the plurality of multi-channel images with the continuous frame type; and
determining the true value of the multi-channel image with the continuous frame type, generated based on each of the plurality of continuous frame images, based on a deformation amount between the plurality of continuous frame images and the single-frame image and the true value of the multi-channel image generated based on the single-frame image.

11. The method according to claim 9, wherein
the true value of each multi-channel image with the discrete frame type in the training set comprises a regression true value of the regression branch and a classification true value of the type classification branch; and
the true value of each multi-channel image with the continuous frame type in the training set comprises a regression true value of the regression branch, a residual true value of the inter-frame residual branch and a classification true value of the type classification branch.

12. The method according to claim 11, wherein
the regression branch comprises a first loss function for representing a difference between the regression prediction value outputted by the regression branch and the regression true value;
the inter-frame residual branch comprises a second loss function for representing a difference between the residual prediction value outputted by the inter-frame residual branch and the residual true value; and
the type classification branch comprises a third loss function for representing a difference between a classification prediction value outputted by the type classification branch and the classification true value.

13. The method according to claim 12, wherein
the total loss function of the key point detection model is determined based on the first loss function and the third loss function, in a case that the key point detection model is trained by using the multi-channel images with the discrete frame type; and
the total loss function of the key point detection model is determined based on the first loss function, the second loss function and the third loss function, in a case that the key point detection model is trained by using the multi-channel images with the continuous frame type.

14. An apparatus for detecting a key point of an image, the apparatus comprising:
a processor configured to execute key point detecting instructions comprising:
an image acquiring module, configured to acquire a to-be-detected image;
a preprocessing module, configured to perform, based on a type of the to-be-detected image, preprocessing on the to-be-detected image to generate a multi-channel image with the type, wherein the type comprises a discrete frame type or a continuous frame type;
a model predicting module, configured to input the multi-channel image into a pre-trained key point detection model, wherein the pre-trained key point detection model comprises a regression branch and an inter-frame residual branch which are parallel; and
a key point determining module, configured to: in a case that the type of the to-be-detected image is the discrete frame type, acquire a regression prediction value outputted by the regression branch and determine coordinates of a plurality of key points in the to-be-detected image based on the regression prediction value; and in a case that the type of the to-be-detected image is the continuous frame type, acquire a regression prediction value outputted by the regression branch and a residual prediction value outputted by the inter-frame residual branch, and determine coordinates of a plurality of key points in the to-be-detected image based on the regression prediction value and the residual prediction value, wherein, in a training process of the key point detection model, the key point detection model comprises the regression branch, the inter-frame residual branch and a type classification branch which are parallel.

15. A computer device comprising a memory and a processor, the memory storing a computer program, wherein the processor, when executing the computer program, implements the method according to claim 1.

16. A non-transitory computer-readable storage medium storing a computer program, wherein the computer program, when executed by a processor, implements the method according to claim 1.

*   *   *   *   *